United States Patent Office

3,480,693
Patented Nov. 25, 1969

3,480,693
AMINOPLAST COATINGS HAVING HYDROXYL CONTAINING STYRENE COPOLYMER AND ALKYD RESIN INCORPORATED THEREIN
Robert W. Hill, Leawood, and Francis R. Galiano, Prairie Village, Kans., assignors to Gulf Oil Corporation, Pittsburgh, Pa., a corporation of Pennsylvania
No Drawing. Filed Jan. 11, 1966, Ser. No. 519,962
Int. Cl. C08g 37/34
U.S. Cl. 260—850                    14 Claims

ABSTRACT OF THE DISCLOSURE

A heat curable resin blend of (A) a copolymer of styrene and methallyl alcohol or allyl alcohol or, alternatively, a hydrogenated copolymer of styrene with acrolein or methacrolein, (B) a curable aminoplast, such as polyakylol melamine or poly(alkoxyalkyl) melamine, and (C) an alkyl resin is disclosed as a coating for various substrates, particularly plastic bottles.

---

This invention relates to coating compositions, and more particularly to curable compositions suitable for surface coating of various substrates.

The use of coatings on substrates such as paper and thermoplastic polymer articles has found widespread use in the industry. Generally, these coatings are applied to improve the characteristics of the articles for aesthetic purposes, printability and to provide resistance to various liquids and to permeation of the polymer by vapors and liquids. However, many of the coatings that have been available for this purpose have been deficient in various respects. For example, although moderately successful for thermoplastic polymer articles, many of the coating compositions presently available either require a preliminary pre-treatment of the polymer surface to promote adhesion, or require long baking cycles to cure the coating compositions, or they can be used only on a limited number of polymer substrates. In addition, such coatings' lack resistance to weathering tend to be brittle and crack on flexing, and militate against the use of such coatings on polymer articles requiring flexing, i.e., "squeeze bottles."

In contrast to the foregoing this invention provides an adherent coating composition of enhanced flexibility and resistance to permeation by a wide variety of liquids.

Accordingly, it is an object of this invention to provide novel coating compositions.

Another object of this invention is to provide novel coating compositions which have good adhesion to a variety of polymer substrates and require only modest baking cycles to cure.

Still another object of this invention is to provide novel coating compositions which adhere well to a variety of polymer substrates, require only modest baking cycles to cure, and which offer effective resistance to attack by a variety of commonly employed organic liquids and solvents.

A still further object of this invention is to provide thermoplastic polymer articles with the surface thereof carrying novel adherent coatings which are flexible and resist cracking.

It is still another object of this invention to provide polymer articles having a surface thereof coated with novel coating compositions which are resistant to attack by a variety of commonly employed liquids and solvents.

Other objects and advantages will become more apparent from the following detailed description of this invention.

It has been discovered, in accordance with this invention, that the above and other related objects and advantages can be obtained by providing a solvent solution of a curable admixture comprised of a hydroxy-containing interpolymer of styrene, a curable triazine aminoplast and a hydroxy containing polyester condensation product having a hydroxy number of at least 80, and preferably 125 to 175. Typical examples of such polyesters are reaction products of one or two selected dibasic acids (or the corresponding anhydrides thereof), dihydric alcohols and a trihydric alcohol. In general, for ease of reaction and faster cures, the hydroxyl groups, of the alcohols, are preferably attached to primary carbons, i.e., so as to form primary alcohols.

More specifically, the hydroxy-containing interpolymers of styrene, comprehended by this invention are the copolymers of styrene and allyl alcohol or methallyl alcohol and hydrogenated copolymers of styrene and acrolein or methacrolein which contain a pendant hydroxy-substituent group capable of reacting with methylol groups of triazine aminoplast curing agents. The method of preparing these copolymers is not critical; and they may be prepared directly by polymerizing styrene with a polymerizable unsaturated alcohol such as allyl and methallyl alcohol, or they may be prepared by suitable modification of styrene copolymers, as for example hydrogenation of a styrene/methacrolein copolymer. Some of these hydroxy-containing styrene copolymers are also commercially readily available.

A typical process for preparing hydroxy-containing interpolymers of styrene (hereinafter referred to for convenience as styrene/hydroxy copolymers) is disclosed in the U.S. Letters Patent No. 2,893,979. As described in this patent, the specific characteristics of the hydrogenated styrene/methacrolein copolymers are dependent upon the extent of hydrogenation effected. Moreover, the number of hydroxy groups obtained and the number of residual aldehyde groups will depend on the amount of hydrogenation, but will not be critical for purposes of this invention since it is only necessary that the styrene/hydroxy-substituent groups per copolymer molecule be capable of reacting with methylol groups to provide a cohesive coating with the other components. Normally, these styrene/hydroxyl copolymers can be prepared with a molecular weight of 700 to 10,000 containing from about 50 to 90 percent of chemically combined styrene. For practical and economic purposes, the preferred hydrogenated styrene/methacrolein and styrene/acrolein copolymers have a molecular weight of 1,000 to 10,000 and contain 60 to 85 weight percent of chemically combined styrene and 4 to 10 weight percent of hydroxy groups.

Typical hydrogenated copolymers of styrene/methacrolein are set forth in Table I below.

TABLE I.—HYDROGENATED STYRENE/METHACROLEIN COPOLYMERS

| | Weight Percent | | Molecular Weight |
|---|---|---|---|
| | Styrene | Hydroxy groups | |
| A | 63 | 9.8 | 8,000 |
| B | 68 | 6.3 | 2,000 |
| C | 75 | 4.4 | 2,000 |
| D | 75 | 4.4 | 4,000 |

Typical of the processes for the direct preparation of styrene/allyl alcohol and styrene/methallyl alcohol copolymers is that disclosed for styrene/allyl alcohol copolymers in U.S. Letters Patents No. 2,894,938 and No. 2,951,831. Although substantially all of these copolymers are operative in the compositions of this invention, the preferred copolymers again have a molecular weight of 1,000 to 10,000, and contain from about 50 to about 85 weight percent of chemically combined styrene.

Typical styrene/allyl alcohol copolymers are set forth in Table II below.

TABLE II.—STYRENE/ALLYL ALCOHOL COPOLYMERS

| | Weight Percent | | Molecular Weight |
|---|---|---|---|
| | Styrene | Hydroxy groups | |
| A | 74 | 5.2 | 1,150 |
| B | 80 | 5.4 | 1,600 |

In general, all of the preferred styrene/hydroxy copolymers, for purposes of this invention, will have a molecular weight of 1,000 to 10,000, 65 to 85 weight percent of chemically combined styrene and 4 to 7 weight percent of hydroxy groups.

The triazine aminoplast curing agents comprehended in this invention are any of the solvent soluble polyalkylol-melamine-aldehyde or polyalkoxyalkyl melamine-aldehyde reaction products well known in the art, and which are able to react with hydroxy substituent groups. These resins can be synthesized in any appropriate manner, and it is only necessary that they be in the uncured state and solvent soluble, i.e., as intermediate products (hereinafter referred to as precondensates) capable of further condensation (curing) on heating, with or without a catalyst. Typical examples of the aminoplast curing agents are the thermosetting alkylated melamine-formaldehyde resins and the polyalkyl ethers of alkylated melamine-formaldehyde resins, as for example the polymethylol-melamines and polymethoxymethyl-melamines. These curable triazine aminoplasts can be used alone or in admixture with one another. Representative of these triazine aminoplasts are methylated-melamines, ethylated melamines, propylated-melamines, butylated melamines, pentylated melamines, hexylated melamines, and the alkyl ether derivatives thereof such as the tetra-methylol melamines, pentamethylol melamines and hexamethylol melamines, as for example trihydroxymethyl-melamine and hexamethoxymethyl-melamine. Also mixed ethers of tetra-, penta-, or hexamethylol melamines containing, for example, both methyl and butyl radicals or both methyl and hexyl radicals can also be used in this invention.

The etherified melamine aminoplasts are easily prepared by reacting the alkylolated melamines (such as tetra-, penta- or hexamethylol melamine) with a large excess of an aliphatic saturated monohydric alcohol having from 1 to 6 carbon atoms, and conducting the reaction acid conditions at a temperature of about 10–40° C. Mixed ethers can be prepared by an interchange reaction wherein an aliphatic alcohol having 2 or more carbon atoms is added to an alkylol-melamine (such as methylol-melamine) which has been etherified with an aliphatic alcohol having a lesser number of carbon atoms while the etherified melamine is in a solution in a suitable inert solvent. For example, when butanol is added to a solution of methylated hexamethylol-melamine, the butanol reacts with the methylated melamine and replaces the pendant methyl groups with butyl groups.

Typical triazine aminoplast resins comprehended in this invention are set forth in Table III below.

TABLE III.—AMINOPLAST RESIN PRECONDENSATES

| Trade Name | Type | Source |
|---|---|---|
| A Cymel 245-8 | Butylated melamine formaldehyde. | American Cyanamid. |
| B Cymel 248-8 | do | Do. |
| C Cymel 247-10 | do | Do. |
| D Cymel 301 | Hexamethoxymethyl-melamine. | Do. |

The polyester condensation product comprehended in this invention consists of the reaction product of (1) an aliphatic dihydric alcohol, (2) an aliphatic trihydric alcohol, and (3) one or two dibasic acids containing from 5 to 12 carbon atoms and preferably two dibasic acids of which one acid is either a benzene dicarboxylic acid or cyclic aliphatic dicarboxylic acid and where the second acid is a saturated acyclic aliphatic dicarboxylic acid. The proportions of the polyester components are not considered critical, and various ratios thereof may be used which will provide a hydroxyl number of 80 to 175 for the polyester product. In preparing the polyester, suitable amounts of the various components in mole ratios may range as follows: 1.5 to 2 moles of the dihydric alcohol per mole of the trihydric alcohol; 2 to 3 moles of total dicarboxylic acids per mole of the trihydric alcohol; and where a combiantion of acids is employed, the ratio of total acids may range from 0 to 4 moles of either the benzene diacid or the cyclic aliphatic diacid per mole of aliphatic acyclic acid. Ordinarily, the proportion of the diacids and dihydric and trihydric alcohols will be such that the resultant polyester will have a hydroxyl number in excess of 80 and preferably in excess of 100. Also, the polyester will have an acid number in the range of 15 to 35 and preferably 15 to 25. The term "benzene dicarboxylic acid" is employed to define dicarboxylic acids and anhydrides thereof based on a single substituted and unsubstituted benzene ring. In general, as indicated above, the dicarboxylic acid will contain 5 to 12 carbon atoms; however, where the indicated combination of acids is employed, the benzene diacid will contain from 8 to 12 carbon atoms and the cyclic and acyclic saturated diacids will contain from 5 to 12 carbon atoms. Typical benzene dicarboxylic acids include phthalic acid, phthalic anhydride, isophthalic acid, 5-tert-butyl isophthalic acid, with the 1,2-cyclohexane dicarboxylic acid illustrative of the cyclic diacids. The acyclic diacids are the saturated aliphatic acids which include glutaric acid, adipic acid, sebacic acid, docosandioic acid and the like.

The dihydric alcohols which may be employed are the aliphatic alcohols which contain from 2 to 8 carbon atoms, and include ethylene glycol, 1,3-propylene glycol, 1,3-butylene glycol, 1,4-butylene glycol, neopentyl glycol, 2,2,4-trimethylpentanediol and the like.

The trihydric alcohol will also be an aliphatic alcohol which will contain from 3 to 6 carbon atoms, such as glycerol, trimethylol propane, trimethylol ethane, 1,2,6-hexanetriol and the like.

A particularly effective polyester when blended with the other ingredients to provide the compositions of this invention will preferably comprise the condensation product of the following components: (a) 15 to 30 mole percent of a benzene dicarboxylic acid selected from the group of isophthalic acid, phthalic acid and phthalic anhydride; (b) 15 to 25 mole percent of adipic acid; (c) 15 to 25 mole percent of a trihydric alcohol selected from the group of trimethylol ethane and trimethylol propane; and (d) 25 to 40 mole percent of a dihydric alcohol selected from the group of neopentyl glycol and 1,3-butylene glycol. If desired, for specialty applications, modest quantities of monobasic acids may be employed in the polyester, as for example those derived from fatty oils, tall oil fatty acids, soybean fatty acids, linseed oil fatty acids, etc.

The polyesters can be prepared by techniques normally employed in the manufacture of the well-known alkyd resins. A convenient way of preparing the polyesters is to charge the reactants to a stirred vessel and heating to temperatures in excess of 100° C., as for example 145° C. to 240° C., which will be sufficient to esterify the carboxyl and hydroxyl groups of the reactants charged. The liberated water is removed by distillation. The reaction will be continued with evolution of water until the polyester resin is rather viscous and the acid number is reduced to below 35 and preferably to a value in the range of about 15 to about 25.

Typical polyester resin components, of this invention, and their methods of preparation are set forth below, with all parts and percentages given as parts and percentages by weight, unless otherwise indicated.

EXAMPLE I

Polyester resin A

A mixture of 128.5 grams (0.96 mole) of trimethylol propane, 499 grams (4.8 moles) neopentyl glycol, 498 grams (3.0 moles) isophthalic acid and 292 grams (2.0 moles) of adipic acid was heated for 1 hour and 52 minutes at 181° C. followed by heating at 200–236° C. for 3 hours and 34 minutes to give 1135 grams of a product having an acid number of 19.9 (mg. KOH per gram of resin), and a hydroxyl number of about 140.

EXAMPLE II

Polyester resin B

A mixture of 579 grams (4.33 moles) of trimethylol propane, 789 grams (7.60 moles) neopentyl glycol, 999 grams (6.75 moles) of phthalic anhydride and 657 grams (4.50 moles) of adipic acid was slowly heated over 6½ hours to 240° C. to obtain a resin having an acid number of 22.1 and a hydroxyl number of 140.

EXAMPLE III

Polyester resin C

A mixture of 257 grams (1.92 moles) trimethylol propane, 225 grams (2.5 moles) 1,3-butylene glycol, 740 grams (5.0 moles) phthalic anhydride and 91.6 grams (0.88 mole) neopentyl glycol was slowly heated over 6½ hours to 218° C. to obtain a polyester having an acid number of 31.5 and a hydroxyl number of 150.

EXAMPLE IV

Polyester resin D

A mixture of 1210 grams (9.03 moles) trimethylol propane, 1649 grams (15.9 moles) neopentyl glycol, 2088 grams (14.1 moles) phthalic anhydride, 1373 grams (9.4 moles) adipic acid and 60 grams of xylene was slowly heated over 8 hours and 42 minutes to an acid number of 23.2 to obtain a polyester having a hydroxyl number of 140.

EXAMPLE V

Polyester resin E

A mixture of 789 grams (7.60 moles) of neopentyl glycol, 999 grams (6.75 moles) phthalic anhydride, 513 grams (4.28 moles) of trimethylol ethane, 657 grams (4.50 moles) of adipic acid and 50 ml. xylene was heated slowly over 5 hours to 240° C., and maintained at temperature for 1½ hours to an acid number of 22.9. 2593 grams of the polyester was obtained.

EXAMPLE VI

Forty parts of the polyester "B" prepared in Example II was blended in 24 grams of 2-nitropropane and 5.6 grams of methanol with 24 grams of the styrene/hydroxy (i.e., styrene/allyl alcohol) copolymer A of Table II, 16 grams of the aminoplast precondensate D of Table III and 8 grams of the commercial plasticizer "Santicizer 141" to provide a base blend containing about 75 percent total solids. A coating solution was prepared by mixing 30 grams of the base blend with 27 grams of 2-nitro-propane and 0.45 grams of p-toluene sulfonic acid. The coating solution was then coated on paper, glass and polyethylene substrates and cured at 165° F. for 8 minutes. The resultant cured film is hard, clear, flexible and displays high gloss and color, as well as resistance to water, solvents, soaps and detergents. These films gave excellent resistance against attack by dilute alkalies, such as 5 percent $NH_4OH$ and 7 percent NaOH, even for exposure periods as high as 225 minutes at 150° F.

The coating solution of this example was also dip applied to two untreated 4-ounce Boston round polyethylene bottles. The polyethylene was of the linear type having a density of 0.940. The coated bottles were then cured by heating for 8 minutes at 165° F. The resultant films on the bottles had good adhesion (high resistance to separation from the substrate with flexing and adhesion tests), high gloss and anti-static properties.

EXAMPLES VII TO XI

The following Table IV sets forth a series of similar blends (e.g., containing styrene/allyl alcohol copolymers of Table II) which when prepared and cured, as in Example VIII, provide cured fillms having properties equivalent to those of the films described in Example VIII.

TABLE IV

| Component, Parts by Weight | Example | | | | |
|---|---|---|---|---|---|
| | VII | VIII | IX | X | XI |
| Polyester: | | | | | |
| A of Example I | 50 | | | | |
| B of Example II | | 50 | | | |
| C of Example III | | | 44 | | |
| D of Example IV | | | | 45 | |
| E of Example V | | | | | 48 |
| A/P Resin:[1] | | | | | |
| III-A | 15 | | | | |
| III-B | | 20 | | | |
| III-C | | | 16 | | |
| III-D | | | | 18 | 18 |
| S/OH[2] Copolymer: | | | | | |
| I-A | 25 | 20 | | 27 | |
| II-B | | | 30 | | 24 |
| Plasticizer:[3] | | | | | |
| A | 10 | 10 | | 10 | |
| B | | | 10 | | |
| C | | | | | 10 |
| Catalyst:[4] | | | | | |
| A, percent | 2 | 2 | 2 | 2 | |
| B, percent | | | | | 2 |
| Solvent[5] A | Sufficient to make 40% nonvolatile solution. | | | | |

[1] Aminoplast resin from Table III.
[2] Styrene/allyl alcohol of Table II.
[3] Weight percent based on total solids in coating composition.
[4] Weight percent based on total solids in coating composition.
[5] 2-Nitropropane, methyl ethyl ketone, or similar solvent.
Plasticizer A is Santicizer 141.
Plasticizer B is Texanol adipate.
Plasticizer C is KP-140.
Catalyst A is p-toluene sulfonic acid.
Catalyst B is isooctyl acid phosphate.

EXAMPLES XII TO XV

Table V below sets forth similar coating compositions prepared with hydrogenated styrene/methacrolein copolymers and which give comparable results. These coating compositions are formulated in all cases with 2 percent p-toluene sulfonic acid and 10 percent Santicizer 141 with percentages being percent by weight based on total solids in composition.

TABLE V

| Example | Polyester | Parts by Weight | A/P[1] Resin | Parts by Weight | S/OH[2] Copolymer | Parts by Weight | Solvent[3] |
|---|---|---|---|---|---|---|---|
| 12 | B of Ex. II | 50 | III-D | 20 | I-A | 30 | A |
| 13 | E of Ex. V | 45 | III-D | 20 | I-B | 35 | A |
| 14 | A of Ex. I | 55 | III-D | 18 | I-C | 27 | A |
| 15 | D of Ex. IV | 50 | III-A | 25 | I-D | 25 | B |

[1] Aminoplast resin of Table III.
[2] Hydrogenated styrene/methacrolein copolymer of Table I.
[3] Sufficient to make 40 percent solution of non-volatile solids.
NOTE.—A=2-nitropropane; B=methyl ethyl ketone.

EXAMPLE XVI

A base blend was prepared by blending 40.5 grams of the polyester "C" (prepared in Example III), 9.8 grams of the styrene/allyl alcohol copolymer II-B of Table II, 6.57 grams of commercial Santicizer 141 plasticizer and 16.4 grams of commercial Cymel 301 hexamethoxymethyl-melamine resin (III-D of Table III) in 12.0 grams 2-nitropropane and 6.0 grams methanol. The base blend was then diluted with 30 grams methyl ethyl ketone followed by addition of 0.45 gram toluene sulfonic acid to provide a working coating composition. The coating composition was then dip applied to glass and to pliable Boston-round polyethylene bottles, and cured for 10 minutes at 180° F. The coatings obtained were clear and glossy, and passed a 10 minute exposure at 25° C. to 5 percent $NH_4OH$ solution.

EXAMPLE XVII

Two coatings compositions were prepared for corresponding base blends prepared as set forth in Table VI below.

TABLE VI

| Component | Base blend, part by weight | |
|---|---|---|
| | A | B |
| Polester B of Example II | 40.5 | 40.5 |
| Styrene/allyl alcohol copolymer of Table II: | | |
| II-A | 9.8 | |
| II-B | | 9.8 |
| Aminoplast III-E of Table III | 16.4 | 16.4 |
| Plasticizer, commercial Santicizer 141 | 6.57 | 6.57 |
| 2-nitropropane | 12.0 | 12.0 |
| Methanol | 6.0 | 6.0 |

Thirty grams of each of the base blends A and B were diluted with 27.0 grams of 2-nitropropane and 0.45 gram toluene sulfonic acid was added to each of the diluted blends to form, respectively, working blends A and B.

Each of the working blends was dip applied to individual glass substrates, to 1″ x 3″ x 0.02″ polyethylene strips and to flamed Boston-round polyethylene bottles, followed by curing of the coating for 8 minutes at 165° F. A clear, glossy and transparent coating was obtained in all samples.

Testing of the coated Boston-round bottles for brittleness and adhesion gave excellent results, i.e., the resultant cured film would not crack or separate from the bottles.

The coated glass substrates were subjected to 5 percent $NH_4OH$ resistance tests with the time of exposure and the results given in Table VII below.

TABLE VII

| | Exposure, Minutes | Results |
|---|---|---|
| Working blend: | | |
| A | 141 | Excellent, only fine pitting. |
| B | 480 | No noticeable change. |

The polyethylene strips were subjected to abrasion resistance tests with the "Bishop Norman RCA Abrasion Tester," and the thickness of the coating was measured. The cycles required to penetrate the films and the thickness are set forth in Table VIII below.

| | Cycles | Thickness, mils |
|---|---|---|
| Working blend: | | |
| A | 10–11 | 0.6–0.7 |
| B | 13–17 | 0.8–0.8 |

Additional polyethylene strips were dip-coated with each of the working blends A and B, followed by curing for 10 minutes at 175° F., and abrasion tests run as above. The number of cycles for penetration of the film and the thicknesses are set forth in Table IX below.

TABLE IX

| | Cycles | Thickness, mils |
|---|---|---|
| Working blend: | | |
| A | 40–42 | 1.2–1.3 |
| B | 35–41 | 1.1–1.3 |

EXAMPLE XVIII

Working blends were prepared from the components set forth in Table X below, by admixture of the components together with stirring until a uniform blend was obtained.

TABLE X

| Component | Blend, parts by weight | | |
|---|---|---|---|
| | A | B | C |
| Polyester Resin B (TMP, see 178402-1) | 40.6 | | |
| Polyester Resin E (TME, see 174415-2) | | 8.30 | 46.1 |
| Styrene/allyl alcohol copolymer II-A | 24.0 | | 27.6 |
| Styrene/allyl alcohol copolymer II-B | | 4.98 | |
| Plasticizer, Santicizer 141g | 8.0 | 1.66 | 9.2 |
| Aminoplast resin III-D | 16.0 | 3.31 | 18.4 |
| Methanol | 5.8 | 3.00 | 6.3 |
| 2-nitropropane | 24.0 | 31.00 | 27.6 |
| Methyl ethyl ketone | 108.0 | | 118.0 |

(A) Each of the working blends were coated on steel panels having a primer coat of non-glossy red oxide coating (gloss=7). Each of the panels was cured at 180° F. and tested for gloss and hardness, with the cure time and test results given in Table XI below.

TABLE XI

| Working Blend | Cure Time, Min. | Test | | | | | |
|---|---|---|---|---|---|---|---|
| | | 60° Gloss, (percent) | | | Pencil Hardness | | |
| | | a | b | c | a | b | c |
| A | 2 | 91 | 92 | 90 | H | H | 2H |
| A | 5 | 96 | 93 | 97 | 2H | 3H | 2H |
| A | 8 | 83 | 89 | 81 | 2H | 2H | 2H |
| A | 10 | 96 | 100 | 100 | 3H | 3H | 4H |
| B | 2 | 82 | 89 | 85 | B | F | F |
| B | 5 | 83 | 77 | 84 | 2H | 2H | 2H |
| B | 8 | 86 | 85 | 81 | 2H | 2H | 3H |
| B | 10 | 87 | 88 | 92 | 4H | 3H | 4H |
| C | 2 | 95 | 96 | 96 | 5B | 5B | 5B |
| C | 5 | 94 | 94 | 96 | 2B | 2B | 2B |
| C | 8 | 89 | 89 | | 2H | 2H | 2H |

(B) Each of the working blends of this example were coated on unflamed polyethylene sheets, and then cured at 175° F. for 10 minutes. The coated sheets were then tested for abrasion resistance on the RCA Abrasion Tester, with the range of results given, in Table XII below, as cycles per mil of coating thickness.

Table XII

Working blend:     Cycles per mil thickness
A ------------------------------------ 24–26
B ------------------------------------ 35–37
C ------------------------------------ 30–35
Uncoated polyethylene ------------------ 8–8

EXAMPLE XIX

In this example a coating composition of this invention was subjected to a six month weathering test in Florida, utilizing as a control a similar composition having substituted therein a conventional polyester based on trimellitic anhydride, herein referred to as TMA-based polyester.

This TMA polyester was prepared from a mixture of 3 moles trimellitic anhydride, 7 moles neopentyl glycol and 1 mole adipic acid, and the mixture heated at about 190° C. to an acid number of 60. Two moles of 2-ethyl hexanol were then added and the heating was continued at 247° C. to an acid number of 2.

A control coating composition (TMA based blend) was prepared by blending, by weight, 60 parts of the TMA-based polyester, 15 parts of the styrene/allyl alcohol copolymer II-B of Table II, 25 parts of commercial Cymel 301 hexamethoxymethyl melamine resin (III-D of Table III) and 10 parts commercial Santicizer 141 plasticizer in sufficient quantity of methyl isobutyl ketone solvent to make a 40 percent solids solution. One series of steel panels were then spray coated with this TMA-based coating blend.

A second series of steel panels were then coated with the coating composition of Example X, and both series of coated panels were exposed for six months to weathering in Florida. The results are set forth in Table XIII below.

TABLE XIII

| Panel | Test | | | |
|---|---|---|---|---|
| | Photovolt Gloss 60° | | Chalking [1] | |
| | Panel Coating | | Panel Coating | |
| | Composition of— | | | |
| | Example X | Example XIX (TMA-based) | Example X | Example XIX (TMA-based) |
| 1 | 47 | 0 | xxx | xxx |
| 2 | 44 | 0 | xxx | xxx |
| 3 | 57 | 0 | xx | xxxx |
| 4 | 52 | 0 | xx | xxxx |
| 5 | 62 | 0 | xx | xxxx |
| 6 | 59 | 0 | xx | xxxx |
| 7 | 28 | 0 | x | xxxx |
| 8 | 28 | 0 | x | xxxx |

[1] Graduated scale, where x is very slight and xxxx is very bad.

The coating compositions of this invention will normally be applied to the articles in the form of a solution consisting essentially of the coating components (i.e., styrene/hydroxy copolymer, a curable triazine aminoplast, and a polyester resin) dissolved in a suitable solvent therefor. A great variety of common solvents can be employed, subject to the obvious limitation that the solvent must dissolve the particular combination of film forming components to be included in the coating composition. Typical solvents that can be employed include methyl ethyl ketone, Carbitol acetate (Carbitol being the monoethyl ether of diethylene glycol), n-butanol, sec-butanol, methyl isobutyl ketone, amyl acetate, nitroethane, dioxane, etc., and mixtures thereof. Thus, a wide range of conventional solvents may be used for dilution of the coating compositions in order to obtain desired levels of solids content, viscosity, and other coating characteristics. Generally, the more powerful solvents such as ketones, esters, and the like are the most satisfactory, but solvents such as xylene and butanol may be used where extreme dilutability is not required. For example, the coating compositions are dilutable with xylene to about 27 percent solids and with nitropropane to about 20 percent. In the few cases where lower solids solutions are desired, a stronger solvent, such as methyl isobutyl ketone may be used.

In some cases, certain limitations on the solvent are imposed by the substrate. Thus, in coating polystyrene or polycarbonate, butanol or a lower alcohol should be used to avoid attack on the plastic substrate. A combination of ethanol and Cellosolve acetate is recommended for coating polyolefin containers, to minimize the residual odors left by many of the commonly used solvents.

The proportion of coating components to solvent can vary over relatively wide ranges depending on the viscosity desired or required for a particular method by which the coating is to be employed. Generally speaking, however, the solution will comprise about 10 to 50 percent, and normally 25 to 45 percent by weight of the coating components.

The proportions of the several coating components can be varied over relatively wide ranges. For example, in the admixture of coating components, the amount of styrene/hydroxy copolymer range from about 20 to about 35 parts by weight, the amount of triazine aminoplast may range from about 15 to about 25 parts by weight, and the polyester resin may range from about 40 to about 60 parts by weight, and the plasticizer may range from about 8 to 12 parts by weight. The specific proportions of coating components will generally be dependent on the type of the several coating components selected for a specific characteristic desired in the coating. Normally and for all practical purposes, the admixture of coating component will comprise from about 20 to 30 parts by weight of the styrene/hydroxy component, 40 to 50 parts by weight of the polyester resin, and from 15 to 20 parts by weight of the aminoplast resin. However, it is to be understood that proportions of coating components outside these ranges can be utilized for the production of coatings having special properties.

In practice, the styrene/hydroxy copolymer, the aminoplast resin and the polyester resin are admixed in the desired proportions in a suitable solvent, and the solution applied to the surface of the article to be coated by conventional techniques such as by spraying, dipping, roller-coating, or flushing in the case of interior coating of containers. Subsequent to the application of the coating, suitable manipulative and draining steps may be employed to insure the application of an even coating on the desired surface of the article. If the coating (in solution) is to be applied to the exterior surface of an article (i.e., a polyethylene bottle), the article can simply be immersed in the coating solution and allowed to drain.

The coating is then cured by subjecting the coated article to a curing temperature for a sufficient period of time to produce the desired chemical reaction between the several coating components. Normally the conditions under which the several coating components can be cured may be varied over a fairly wide range, however, preferably, the coating will be cured at a temperature of 150 o 400° F. for a period of 10 seconds to 30 minutes. As will be understood, shorter periods of time may obviously be employed with higher curing temperatures. Normally, the properties of the substrate being coated will constitute the upper limit of the curing temperature. Although the coating can be cured by heating alone, the curing times and temperatures can preferably be varied and controlled by use of catalysts of the type commonly employed for the curing of known aminoplast resins. Typical examples of these catalysts include toluenesulfonic acid, phosphoric acid, butyl phosphoric acid, phenyl phosphoric acid, isooctyl phosphoric acid, sulfamic acid, benzenephosphoric acid, methane sulfonic acid, and hydrochloric acid. For example, before application, the resin solution may be catalyzed by addition of 2 percent p-toluenesulfonic acid based on weight of resin solids. The catalyzed resin solution may be applied by any conventional means such as spraying, dipping, roller coating or brushing. Curing is effected by application of heat to the coated substrate using commercial drying and heating ovens or infrared radiation.

The catalyzed resin solution has very good pot life. Very little change in viscosity has been observed over a period of several days. Even after standing for longer periods, any increase in viscosity may be compensated and retarded by addition of small amounts (normally not more than 5 percent) of methanol.

Coatings prepared from the compositions of this invention are hard yet remain sufficiently flexible so as to sustain repeated flexing of plastic and paper substrates without cracking. The coatings also show high gloss.

In preparing the coating compositions of this invention, it has been noted that in many cases the quality of the ultimately cured coating can be improved by including a plasticizer in the coating compositions. When a plasticizer is employed, it should be employed in the ratio of 5 to 30 and preferably 10 to 20 parts per 100 parts of the total amount of the three coating components. Common plasticizers which are suitable for use in this invention include tricresyl phosphate, dioctyl phenyl phosphate, dioctyl phthalate, dioctyl adipate and didecyl phthalate. In addition to the foregoing, virtually any of the common and well-known ester type plasticizers may be employed.

In addition to the additives above described, the coating compositions of this invention can also contain additional additives of the type commonly employed in coating compositions. For example, the coating compositions may be colored with either oil or spirit-soluble colors and dyes, or pigments such as carbon black, titanium dioxide and other common pigments included in baking enamels. Stabilizers, anti-oxidants, anti-static agents and the like may also be employed if desired.

The coating compositions, of this invention, comprised of indicated ranges of components provide especially significant advantages. For example, coating formulations prepared from 50 weight percent polyester resin D, 30 weight percent styrene/allyl alcohol copolymer II–A and 20 weight percent of aminoplast III–D gave flexible coatings on polyethylene bottles which would not crack on extensive repeated bending and squeezing of the bottles, which is a marked improvement over coating formulations comprised of 25 percent of the polyester resin B, 40 percent of the styrene/hydroxy copolymer II–B and 35 percent of the aminoplast III–D. In general, coating compositions of this invention containing amounts of the aminoplast in excess of the numerical range indicated therefor are relatively brittle in comparison to those containing the aminoplast within the indicated range therefor.

Another advantage obtained by the coating compositions of this invention is excellent adhesion to a substrate as compared to the relative adhesion of compositions comprised only of a styrene/hydroxy copolymer and aminoplasts (i.e., devoid of polyester resins described herein).

Still further advantages of this invention reside in quicker cures of the coating compositions and better solvent resistance as compared to mere polyester and aminoplast systems devoid of the styrene/hydroxy copolymers comprehended in this invention.

For example, formulations containing 75 weight percent of the polyester C and 25 weight percent of the aminoplast III–D require a cure of 15 minutes at 190° F. to obtain a coating which will resist immersion in 5 percent $NH_4OH$ solution of 6 to 10 minutes. In contrast, compositions of this invention containing 50 weight percent of the polyester C, 30 weight percent of the styrene/hydroxy copolymer II–A and 20 weight percent of the aminoplast III–D give the same degree of ammonia resistance after only a 2 minute cure at 190° F. or a 6 minute cure at 170° F.

Also, coating compositions of this invention comprised of 50 percent of the polyester C, 30 percent of the styrene/hydroxy copolymer II–A and 20 percent of the aminoplast III–D when cured for 15 minutes at 190° F. give a coating which is resistant to 5 percent ammonia hydroxide for 70 minutes.

In contrast, substitution of urea/formaldehyde and alkylated urea/formaldehyde resins for the melamine aminoplasts of this invention resulted in coatings which were brittle, lacked adhesion and failed in relatively quick times in resistance tests with 5 percent $NH_4OH$ and 7 percent NaOH solutions.

In addition to the specific polymers noted above, other polymers and substrates that can be coated with the coating compositions of this invention include paper, metal and polymer members of the following groups: homopolymers of ethylene, ethylene interpolymers containing at least 50 percent polymerized ethylene, homopolymers of propylene, homopolymers of styrene, styrene interpolymers containing at least 50 percent polymerized styrene, polycarbonates, homopolymers of vinyl chloride, vinyl chloride interpolymers containing at least 50 percent polymerized vinyl chloride, nylon, cellulose acetate, cellulose propionate, cellulose butyrate, melamine-formaldehyde resins, and phenolformaldehyde resins.

The ethylene homopolymers that may be coated can be of the conventional high pressure type or the so-called linear type. In general, any ethylene homopolymer having a density in the range of about 0.915 to 0.97 may be employed. The ethylene interpolymers that may be employed can be essentially any of the known ethylene interpolymers containing at least 50 weight percent of the polymerized ethylene. Typical examples of such ethylene interpolymers include interpolymers of ethylene with vinyl acetate, methyl acrylate, methyl methacrylate, ethyl acrylate and the like. The propylene homopolymers that may be employed are the isotactic type that are prepared using the so-called Ziegler-type catalysts. The styrene homopolymers that may be employed are those of the type widely used commercially and that are prepared by either mass, emulsion or suspension polymerization methods. Styrene interpolymers that are particularly suitable for use in the invention include the so-called "rubber modified" styrene polymers which have high impact strength.

Other suitable styrene interpolymers include styrene-acrylonitrile interpolymers and the so-called ABS polymers which are polymers containing styrene, acrylonitrile and a butadiene. The polycarbonates that may be employed are the commercial products which are sold under the trade names of Lexan and Merlon.

The vinyl chloride homopolymers and interpolymers that are useful are of the types commercially available, particularly the homopolymers and the vinyl chloride-vinyl acetate copolymers. The nylons and various cellulosic polymers employed are of the commercially available type employed for molding applications. The melamine and phenolic resins that can be most advantageously coated are of the cured, filled type. In particular, dinnerware molded from filled melamine-formaldehyde resins can be coated to provide dinnerware having high gloss and good abrasion resistance.

The coated polymer articles provided by the present invention have many outstanding properties. Almost without exception, the coatings laid down on the substrate are glossy and aesthetically pleasing. The coatings are tough and flexible, show good adhesion to the substrate, have good abrasion resistance, and have excellent resistance to a wide variety of solvents such as hydrocarbons, alcohols, ketones, alkalies and water. Because of these properties, plastic containers such as bottles which are coated by the method of the invention have outstanding properties. In particular, such coated containers have particular utility in the packaging of cosmetics whose volatile components, as performing ingredients, are not readily lost, as is the case when such cosmetics are packaged in conventional plastic containers. Similarly, in the packaging of foods and beverages, flavoring ingredients are not lost by diffusion, as is otherwise encountered when such materials are packaged in conventional plastic containers.

The plastic articles to be coated by the method of the invention can be coated by diverse methods commonly used in the art. For example, such articles can be coated by spraying, brushing, dipping, and the like. If desired, the plastic substrate to be coated can be given a preliminary treatment such as flaming, but this is ordinarily not required. Coatings of optimum properties are obtained by heating the coated article for relatively short times at elevated temperatures, e.g., 5 minutes at temperatures of 175° F.

The above descriptions and particularly the examples are set forth for purposes of illustration only. Many variations and modifications thereof will be apparent to those skilled in the art and can be made without departing from the spirit and scope of the invention herein described.

What is claimed is:

1. A heat curable composition comprising an admixture of:
  (A) a hydroxy-containing interpolymer of styrene containing from about 35 percent to about 75 percent of chemically combined styrene and selected from the group consisting of
    (a) a copolymer of styrene with a comonomer selected from the group consisting of methallyl alcohol and allyl alcohol, and
    (b) a hydrogenated copolymer of styrene with a comonomer selected from the group consisting of acrolein and methacrolein containing from about 35 percent to about 75 percent of chemically combined styrene based on the weight of the hydrogenated copolymer;
  (B) a curable aminoplast capable of reacting with hydroxy substituent groups and selected from the class of polyalkylol melamines and poly(alkoxyalkyl) melamines; and
(C) a polyester condensation product of
(a) a trihydric alcohol,
(b) a dihydric alcohol, and
(c) a dibasic acid selected from the group consisting of
(i) one dibasic acid containing from 5 to 12 carbon atoms, and
(ii) two dibasic acids, each containing from 5 to 12 carbon atoms.

2. The composition of claim 1 wherein said trihydric alcohol is selected from the group consisting of
(a) trimethylol propane and
(b) trimethylol ethane,
with said dihydric alcohol selected from the group consisting of
(a) neopentyl glycol and
(b) 1,3-butylene glycol, and
said dibasic acid consists of an acid selected from the group consisting of
(a) benzene dicarboxylic acids containing from 5 to 12 carbon atoms and
(b) acyclic aliphatic acids containing from 5 to 12 carbon atoms.

3. The composition of claim 1 wherein said polyester is a condensation reaction product of
(A) a trihydric alcohol selected from the group of
(a) trimethylol propane and
(b) trimethylol ethane,
(B) neopentyl glycol
(C) a benzene dicarboxylic acid containing from 5 to 12 carbon atoms, and
(D) an acyclic dicarboxylic acid selected from the group of saturated fatty acids containing from 5 to 12 carbon atoms.

4. The composition of claim 3 wherein said benzene carboxylic acid is selected from the group of phthalic acid, isophthalic acid and phthalic anhydride, and said acyclic dicarboxylic acid is adipic acid.

5. The composition of claim 4 wherein said admixture comprises
(A) 20 to 35 parts by weight of said hydroxy-containing interpolymer, and said interpolymer contains from about 4 to 10 weight percent of substitutent hydroxy groups, with said interpolymer selected from the group consisting of
(a) a copolymer of styrene and allyl alcohol, and
(b) a hydrogenated copolymer of styrene and methacrolein;
(B) 15 to 25 parts by weight of said aminoplast; and
(C) 40 to 60 parts of said polyester condensation product.

6. The composition of claim 1 wherein said admixture comprises
(A) 20 to 35 parts by weight of said hydroxy-containing interpolymer, and said interpolymer contains from about 4 to 10 weight percent of substitutent hydroxy groups, with said interpolymer selected from the group consisting of
(a) a copolymer of styrene and allyl alcohol, and
(b) a hydrogenated copolymer of styrene and methacrolein;
(B) 15 to 25 parts by weight of said aminoplast; and
(C) 40 to 60 parts of said polyester condensation product.

7. The composition of claim 6 wherein said polyester condensation product is the reaction product of
(A) 15 to 25 mole percent of a trihydric alcohol selected from the group of
(a) trimethylol propane, and
(b) trimethylol ethane,
(B) 25 to 40 mole percent of a dihydric alcohol selected from the group of
(a) neopentyl glycol
(b) 1,3-butylene glycol;
(C) 15 to 30 mole percent of a benzene dicarboxylic acid selected from the group of
(a) phthalic acid,
(b) isophthalic acid, and
(c) phthalic anhydride; and
(D) 15 to 25 mole percent of adipic acid.

8. The composition of claim 7 wherein said polyester condensation product has an acid number less than about 35.

9. The cured composition of claim 1.
10. The cured composition of claim 7.
11. A substrate coated with the composition of claim 1.
12. A substrate coated with the composition of claim 7.
13. The substrate of claim 11 wherein said composition is cured.
14. The substrate of claim 12 wherein said composition is cured.

References Cited
UNITED STATES PATENTS

| | | | |
|---|---|---|---|
| 3,211,579 | 10/1965 | Reiter | 117—138.8 |
| 3,329,739 | 7/1967 | Semroc | 260—850 |
| 3,382,294 | 5/1968 | Christenson et al. | 260—850 |

MURRAY TILLMAN, Primary Examiner

JOHN T. GOOLKASIAN, Assistant Examiner

U.S. Cl. X.R.

117—138.8, 161; 260—855